May 3, 1949.  S. R. SMITH, JR  2,469,215
PROTECTIVE DEVICE
Filed Sept. 9, 1944
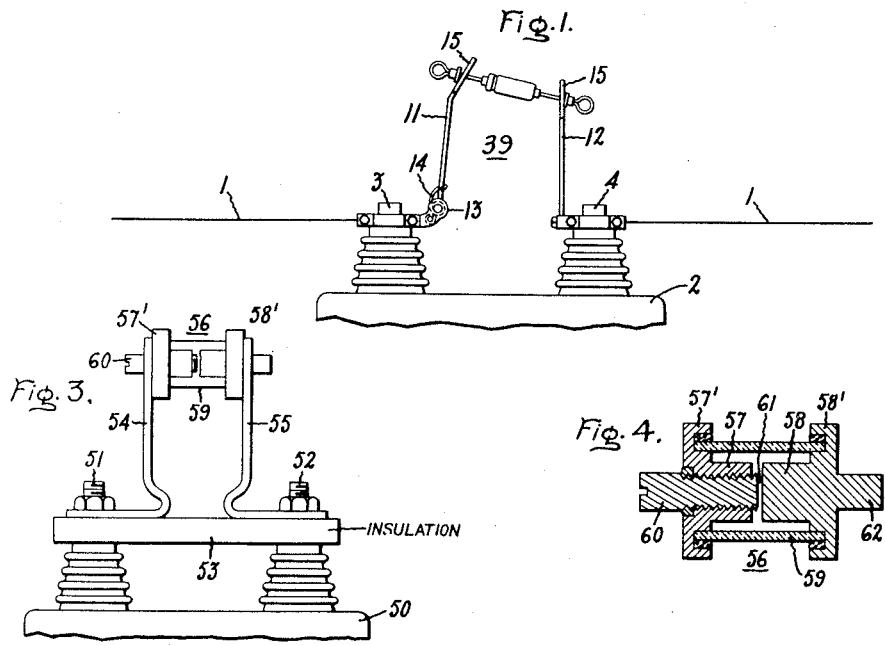
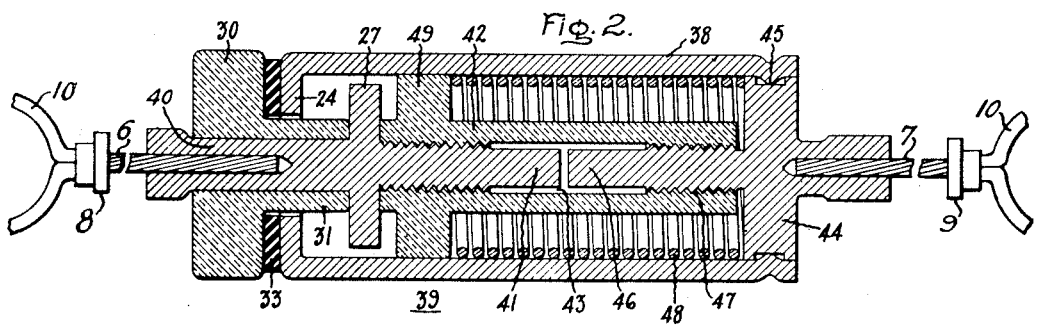
Inventor:
Sidney R. Smith Jr.,
by Harry E. Dunham
His Attorney.

Patented May 3, 1949

2,469,215

UNITED STATES PATENT OFFICE 2,469,215

PROTECTIVE DEVICE

Sidney R. Smith, Jr., Pittsfield, Mass., assignor to General Electric Company, a corporation of New York Application September 9, 1944, Serial No. 553,365

1 Claim. (Cl. 200—118)

My invention relates to protective devices, and more particularly to a protective device adapted for protecting electrical devices or circuits such as series capacitors, or the like.

In series capacitor installations which are used for line drop compensation, the inductive reactance of the line is completely or partially neutralized by the capacitive reactance of the series capacitor so as to minimize the effective impedance of the line. In the event of a short circuit beyond the capacitor installation the current in the line and through the capacitor may reach values a great many times above normal full load currents. As long as normal load and insulation exist on the circuit the series capacitor is not subjected to more than its normal share of voltage which often is less than 500 volts. However, in the case of a fault on a portion of the circuit beyond the capacitor, particularly if the fault is closely adjacent to the capacitor, one terminal of the capacitor assumes substantially ground potential if the fault is a ground fault which means that full line voltage which might be several thousand volts and possibly even higher voltages due to resonant conditions would be applied to the series capacitor which would damage it in a very short space of time. It is obvious that if a capacitor is chosen of sufficient voltage rating to withstand these momentary overvoltages which occur when a fault occurs on the associated line, that the cost, which increases with the square of the voltage, becomes prohibitive. In order to avoid such uneconomical operation of the capacitors it has been customary to shunt the series capacitor during line fault conditions so as to greatly reduce or eliminate the series impedance of the installation until the short circuit is clear. The more effectively this is accomplished, the lower will be the cost per kva. of the capacitor.

My invention is particularly concerned with a new and improved device which will shunt an electrical device, such as a series capacitor or an electrical circuit such as a series lighting circuit, in a very short increment of time after a fault occurs on the associated circuit or system.

It is an object of my invention to provide an improved protective device for electric circuits and electrical devices.

It is another object of my invention to provide a new and improved voltage responsive shunting device which is simple and inexpensive to manufacture and yet fool-proof in operation.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a front view of the protective device of my invention as applied to a series capacitor circuit somewhat schematically shown; Fig. 2 is an enlarged sectional view of the protective device of my invention shown in Fig. 1; Fig. 3 is a view similar to Fig. 1 of a modification of my invention; and Fig. 4 is an enlarged sectional view of a portion of Fig. 3.

Although I have illustrated the protective device of Fig. 1 of my invention as applied to protecting a capacitor installation in a series capacitor circuit in which the capacitor is shunted in response to operation of the protective device of my invention, it should be understood that my invention is equally applicable to the protection of other electrical devices or circuits in which, in response to an overvoltage condition, shunting of a particular circuit or device is desired and yet wherein lightning or surge voltages of short duration will not adversely affect the device.

Referring now to Fig. 1, I have illustrated an electric circuit 1 having associated therewith a series capacitor 2 provided with line terminals 3 and 4, respectively, connected to electric circuit 1. In order to protect the series capacitor 2 in the event of a fault condition on electrical circuit 1, I provide a voltage responsive shunting device 39 best shown in Fig. 2. This voltage responsive shunting device is preferably provided with conducting flexible cables 6 and 7 at either end thereof which are connected to terminals 8 and 9, respectively, each including a loop 10. The loops 10 are provided so that the control device 39 may readily be handled by means of a switch stick.

As is clearly indicated in Fig. 1, control device 39 is adapted to be connected between a pair of arms 11 and 12, respectively associated with the terminals 3 and 4 of capacitor 2. Arms 11 and 12 are preferably similar to the arms disclosed in my prior Patent 2,348,029, granted May 2, 1944, and assigned to the same assignee as the present application. As illustrated, arm 12 is rigidly attached to capacitor terminal 4, while arm 11 is pivotally mounted at 13 to terminal 3 and biased in a counterclockwise direction as viewed in Fig. 1, by means of spring 14. The outer ends of the arms 11 and 12 are preferably provided with spring biased jaw members 15 substantially like the jaw members of my prior patent referred to above. These jaw members are preferably double as shown in my prior patent so that a flexible cable such as 6 or 7, may be inserted on either side of arm 11 or 12.

As best shown in Fig. 2, the flexible cable 7 is suitably fastened to a conducting and closure plate 44 while the flexible cable 6 is suitably fastened to a conducting member 40. A conducting housing 38 is provided which is provided with a circumferential flange 24 forming a stationary contact of the shunting device generally indicated at 39. The conducting member 40 comprises movable contact 27 for engaging contact with circumferential flange 24. Conducting member 40 is provided with an extension which includes an electrode 41. Threadedly mounted on conducting member 40 within conducting housing 38 is an insulating member 42 having a chamber 43 formed therein for accommodating electrode 41. Conducting end closure plate 44 which is in sealing engagement with conducting housing 38 as indicated at 45, is provided with an extension including an electrode 46 extending into chamber 43 so as to define a suitable gap in chamber 43 between electrodes 41 and 46. Electrode 46 is provided with a threaded portion 47 for engaging a threaded portion of insulating member 42 whereby the gap between electrodes 41 and 46 may be properly adjusted. A suitable spring means 48 bears against end closure plate 44 and an enlarged portion 49 of insulating member 42 so as to tend to move contacts 24 and 27 into engagement. Insulating member 42 which is preferably formed of frangible material holds spring means 48 under compression as long as insulating member 42 is intact. In the event of an overvoltage causing sustained arcing across the gap between electrodes 41 and 46 the frangible member defining chamber 43 will be ruptured and spring means 48 will move contact 27 into engagement with contact 24.

It will be obvious from the above description that the electrical device such as the capacitor 2 can be restored to operating condition after control device 39 has operated without deenergizing the line and without the use of jumpers or other equipment. All that is necessary is the insertion of a new control device 39 in the other contact fingers of the double jaw members 15 and the subsequent removal of the control device 39 which has operated due to overvoltage.

In Figs. 3 and 4 I have illustrated a modification of my invention which is very simple and inexpensive and which could be used very satisfactorily particularly in connection with internally mounted series capacitors, such as those used in large welding sets. In such welding sets when the capacitor is shorted, due to overvoltage, the circuit is detuned and the current drops off to a relatively low value so that the contact duty is not very severe.

Referring now to Fig. 3, I have illustrated a capacitor 50 provided with terminals 51 and 52. Supported across terminals 51 and 52 is an insulating base 53 upon which are supported heavy, flat conducting spring clips 54 and 55 which are biased toward each other. Spring clip 54 is connected to terminal 51 while spring clip 55 is connected to terminal 52. An electric control device 56, best shown in Fig. 4 and somewhat analogous to the control device 39 of Fig. 3, is supported between spring clips 54 and 55.

Control device 56 comprises a pair of electrodes 57 and 58 each provided with a peripheral flange 57' and 58', respectively. Electrodes 57 and 58 are held in spaced axial relationship by a frangible housing 59 engaging recesses in the adjacent faces of peripheral flanges 57' and 58'. Housing 59, which may be constructed of glass for example, has the ends thereof in sealing engagement with flanges 57' and 58'. Electrode 57 is provided with a member 60 threadedly mounted along the axis of electrode 57 so as to define with electrode 58 a suitable adjustable gap 61. Electrode 58 is also provided with an extension 62 extending outside of frangible housing 59. The member 60 and extension 62 are adapted to be inserted in suitable openings in the ends of spring clips 54 and 55, respectively.

In the event of an overvoltage, gap 61 arcs over and the capacitor 50 discharges across the gap causing the frangible housing 59 to break and permitting the heavy spring clips 54 and 55 to push and hold electrode 58 in engagement with member 60 thereby effectively shunting the capacitor 50. To restore the circuit to proper operating conditions all that is necessary is to replace control device 56.

Although I have disclosed a particular embodiment of my invention, it will be obvious to those skilled in the art that modifications may be made without departing from my invention and I intend in the appended claim to cover all such changes and modifications as fall within the true spirit and scope of my invention.

What I claim as new and desire to secure by Letters Patent of the United States is:

A control device for shunting an electrical circuit or device in response to a predetermined overvoltage comprising a pair of terminals adapted to be connected in shunt with said electrical circuit or device, a conducting housing electrically connected to one of said terminals, a conducting member within said housing connected to said other terminal, means biasing said conducting member into conducting engagement with said housing, and means comprising a frangible member restraining said last mentioned means including a gap mounted within said frangible member and connected across said terminals, said gap being so constructed and arranged as to arc over in response to a predetermined overvoltage across said terminals to cause disintegration of said frangible member and engagement of said conducting member with said housing.

SIDNEY R. SMITH, Jr.

REFERENCES CITED

The following references are of record in the file of this patent:

UNITED STATES PATENTS

| Number | Name | Date |
|---|---|---|
| 397,109 | Bussman | Feb. 5, 1889 |
| 1,049,366 | Jackson | Jan. 7, 1913 |
| 1,458,611 | Brach | June 12, 1923 |
| 1,597,320 | Klauber | Aug. 24, 1926 |
| 1,726,807 | Cook | Sept. 3, 1929 |
| 1,955,571 | Wood | Apr. 17, 1934 |
| 2,056,118 | Basse | Sept. 29, 1936 |
| 2,118,437 | Kayatt | May 24, 1938 |
| 2,277,222 | Goldner | Mar. 24, 1942 |
| 2,295,320 | Allen | Sept. 8, 1942 |
| 2,296,708 | Earle | Sept. 22, 1942 |
| 2,305,436 | McMorris | Dec. 15, 1942 |
| 2,315,320 | Earle | Mar. 30, 1943 |
| 2,323,720 | Marbury et al. | July 6, 1943 |
| 2,418,017 | Ellicock | Mar. 25, 1947 |